(12) United States Patent
Kim

(10) Patent No.: US 6,557,107 B1
(45) Date of Patent: Apr. 29, 2003

(54) POWER-SAVING MODE RELEASE ERROR DETECTION AND RECOVERY LOGIC CIRCUIT FOR MICROCONTROLLER DEVICES

(75) Inventor: Jong-In Kim, Kyunggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/441,860

(22) Filed: Nov. 17, 1999

(30) Foreign Application Priority Data

Nov. 18, 1998 (KR) .............................. 98-49463

(51) Int. Cl.[7] .............................. G06F 1/32; G06F 1/26
(52) U.S. Cl. ........................ 713/320; 713/300; 327/544
(58) Field of Search ........................... 702/69; 710/69; 712/236; 713/1, 300, 320, 321, 322, 323, 324, 201; 714/200; 327/544

(56) References Cited

U.S. PATENT DOCUMENTS

| | | | | |
|---|---|---|---|---|
| 5,867,718 A | * | 2/1999 | Intrater et al. .............. | 713/323 |
| 6,021,500 A | * | 2/2000 | Wang et al. ................ | 713/300 |
| 6,055,643 A | * | 4/2000 | Chaiken ..................... | 713/323 |
| 6,065,122 A | * | 5/2000 | Wunderlich et al. .......... | 710/2 |
| 6,173,409 B1 | * | 1/2001 | Watts et al. ................ | 713/322 |
| 6,256,746 B1 | * | 7/2001 | Cheng ........................ | 713/600 |
| 6,308,278 B1 | * | 10/2001 | Khouli et al. ............... | 713/323 |

\* cited by examiner

*Primary Examiner*—Thomas Lee
*Assistant Examiner*—Tong-Thai Tien Nguyen
(74) *Attorney, Agent, or Firm*—Mills & Onello, LLP

(57) ABSTRACT

A microcontroller enters a power saving mode in order to reduce power consumption. A logic circuit detects a power-saving mode release status irrespective of the occurrence of a power-saving mode release error due to incorrecct bit settings of control registers. Accordingly, the microcontroller recovers its normal operation. In a preferred embodiment, the microcontroller includes a clock generator that provides a microcontroller system clock signal, the microcontroller having a power-saving mode during activation of which the clock generator ceases generation of the microcontroller system clock signal. A power-save release detection circuit detects a transition in the level of at least one input/output data signal during operation in the power saving mode. In response to the transition, the power-save release detection circuit generates a power-save mode release signal to release the clock generator from the power saving mode, which causes the clock generator to resume generation of the microcontroller system clock signal.

17 Claims, 4 Drawing Sheets

POWER-SAVING MODE RELEASE ERROR DETECTION AND RECOVERY LOGIC CIRCUIT FOR MICROCONTROLLER DEVICES

BACKGROUND OF THE INVENTION

1. Field of the Invention

The present invention relates generally to the field of microcontrollers (or microcomputers) and, more particularly, to power-saving mode release error detection and recovery logic circuits that permit microcomputers to recover their normal operation modes from a power-saving mode.

2. Related Art of the Invention

In the field of microcontrollers, power saving modes, such as, "Stop" and "Idle" modes have been implemented to reduce power consumption of the microcontrollers during dormant periods. Such power saving modes are very useful in battery-powered small instruments incorporating microcontrollers, for example, remote control transmitters and smart cards.

Particularly, during stop mode, an on-chip primary oscillator of a microcontroller ceases generation of the microcontroller primary clock, so as to halt operation of its central processing unit (CPU) and all peripherals. In this manner, during stop mode, all system functions of a microcontroller are halted while the data stored in internal register files are retained, thereby reducing current consumption by the microcontroller. Once a microcontroller has entered stop mode, the microcontroller is held dormant in a wait status until the microcontroller is stimulated externally to reinitiate processing.

To cause the microcontroller to enter stop mode, a control register of the microcontroller may have to be loaded with a specific value before execution of a stop instruction. Stop mode is commonly released either by a system reset or by an external interrupt.

In the case of a microcontroller employing external interrupts to initiate release from stop mode, there is a need for certain bit settings in pertinent control registers such as interrupt control registers, input/output port mode control registers and a stop mode control register. If, however, the bits are not set correctly, owing to system noise, anomalies, or the like, then interrupt requests will not be serviced, and the microcontroller will not be released from stop mode. While system reset may be effective for releasing the device from stop mode, such system-wide resetting of registers is undesirable, as most information is lost upon system-wide reset.

Based upon the above, it can be appreciated that there presently exists a need for a microcontroller architecture that mitigates or eliminates the above-described limitations.

SUMMARY OF THE INVENTION

The present invention is accordingly directed to a microcontroller and method that substantially obviate the aforementioned limitations.

According to the present invention, a microcontroller with a power saving mode comprises a logic circuit that detects a power-save mode release command. The microcontroller exits power-save mode and recovers normal operation irrespective of the occurrence of errors due to erroneous programming of bit settings of interrupt control circuits and registers within the microcontroller.

According to a preferred aspect of the invention, a microcontroller includes a power-save release detection circuit which is connected to at least one data port sensing circuit, detects a transition in the level of the at least one data signal during operation in power-saving mode and releases the microcontroller from the power saving mode when the transition occurs.

The microcontroller may further comprise an interrupt control circuit and a logic gate circuit. The interrupt control circuit generates an interrupt processing control signal when at least one interrupt is generated by at least one interrupt source. The logic gate circuit has a first input for receiving a power-save release signal from the power-save release detection circuit, a second input for receiving an internal or external system reset signal to reset a system on which the microcontroller is mounted, a third input for receiving the interrupt processing control signal, and an output for providing an oscillation start signal to release the microcontroller from the power saving mode when at least one of the power-save release signal, the system reset signal and the interrupt processing control signal is activated. The data port sensing circuit preferably senses transitions in the level of input data at an input data port and output data at an output data port.

According to another preferred aspect of the invention, a microcontroller includes a clock generator, at least one input/output port circuit for inputting/outputting at least one data signal, and a power-save release detection circuit. The clock generator provides a microcontroller system clock signal in normal operation modes and test modes of the microcontroller. In the power saving mode of the microcontroller, the clock generator stops generating the microcontroller system clock signal. The power-save release detection circuit is connected to the at least one input/output port circuit. The power-save release detection circuit detects a level transition of the at least one input/output data signal in the power saving mode and generates a power-save release signal to release the clock generator from the power saving mode when the level transition of the at least one input/output data signal occurs, so that the clock generator resumes generating the microcontroller system clock signal in response to the power-save release signal.

According still another aspect of the invention, there is provided a method for resuming operation of a microcontroller having a power saving mode to reduce the power consumption of the microcontroller. In the method, the microcontroller is made to enter a power saving mode. A level transition of at least one input/output data signal at the microcomputer's at least one data input/output terminal is detected in the power saving mode. When the level of the at least one input/output data signal transitions, the microcontroller is released from the power saving mode.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

The embodiments of the invention will be discussed with reference to remote control transmitter (or remote controller) applications for convenience. It is noted, however, that the inventive concept of the presently disclosed embodiments is equally applicable to other various types of microcontrollers designed for various applications.

As can be seen in accompanying drawings, a novel microcontroller of the present invention comprises a logic circuit that senses and properly reacts to a power-save mode release process of the microcontroller. Proper recovery to normal operation is ensured, regardless of the occurrence of a power-saving mode release errors for example caused by failure in the appropriate bit settings of interrupt control circuits within the microcontroller.

Figure 1:
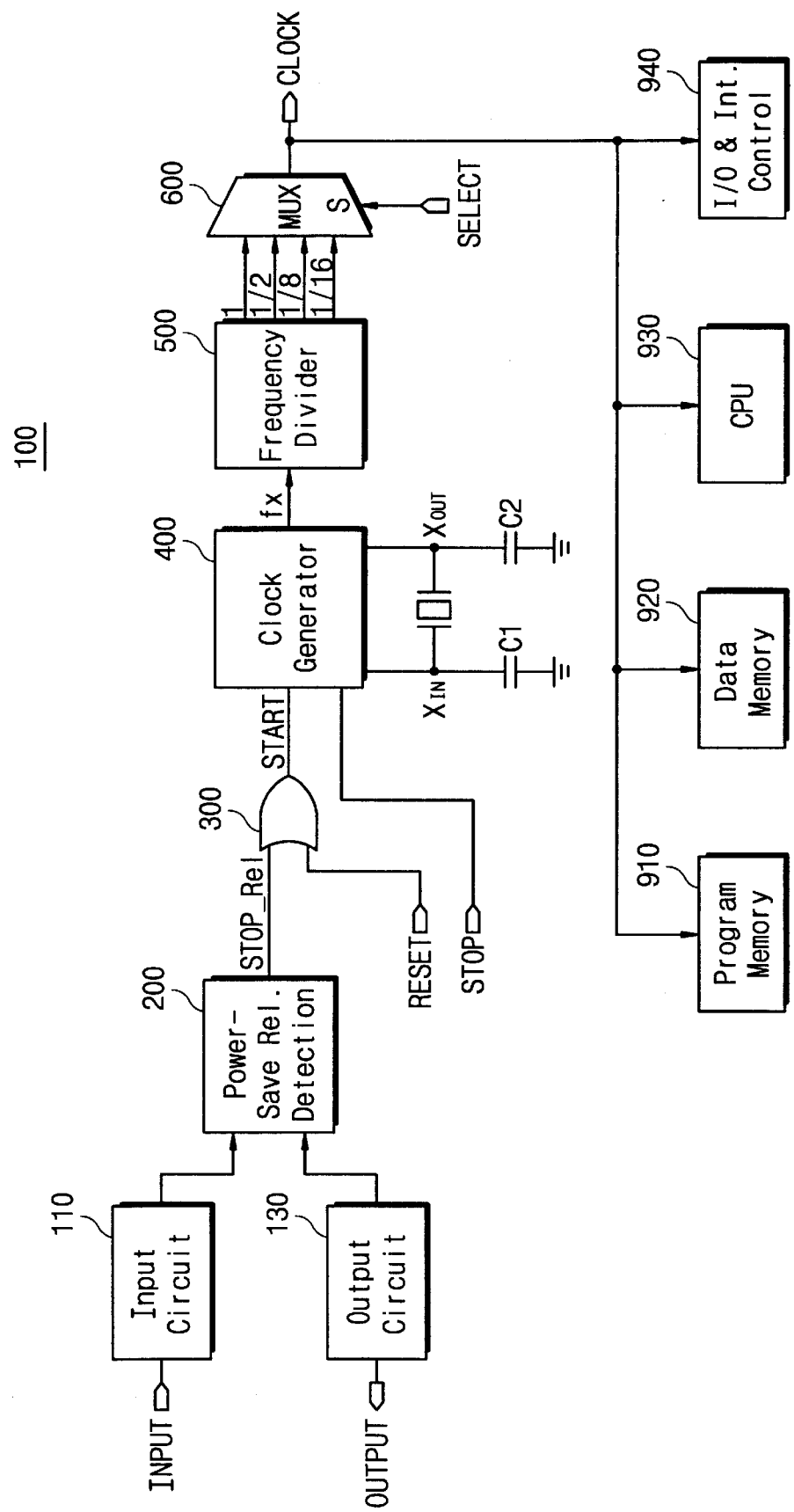
FIG. 1 is a block diagram illustrating a preferred embodiment of a microcontroller according to the Sent invention.

Reference is made first to FIG. 1, which illustrates a microcontroller 100 according to a first preferred embodiment of the present invention. Referring to FIG. 1, the microcontroller 100 comprises an input port circuit 110 coupled to several input ports of the microcontroller, an output port circuit 130 coupled to several output ports, a power-save release detection circuit 200, an OR logic gate 300, a clock generator or system oscillator 400, a frequency divider 500, a clock multiplexer/selector 600, a program memory 910, a data memory 920, a central processing unit 930, and input/output (I/O) and interrupt control circuitry 940.

The microcontroller 100 is preferably a versatile general-purpose microcontroller, for example one especially suitable for use in remote controllers. Examples of contemporary remote controllers are described in U.S. Pat. No. 5,172,333 issued to Fairweather and U.S. Pat. No. 5,726,645 issued to Kamon et al., incorporated herein by reference.

The microcontroller 100 preferably includes two power saving modes, namely "Idle" and "Stop" modes programmed by IDLE and STOP instructions, which affect the microcontroller system clock fx.

The idle mode of the microcontroller 100 is invoked by the instruction IDLE. In this mode, operations of the CPU 930 are halted while some peripherals remain active. During this mode, the microcontroller system clock signal fx is gated away from the program memory 910, data memory 920 and CPU 930, but continues to be supplied to the I/O and interrupt control circuitry 940 and secondary timers.

There are two preferred manners by which idle mode is released. A first technique executes an internal or external system reset operation. According to the first technique, all system and peripheral control registers are reset to their default values and the contents of all data registers are retained. The system reset automatically selects the slowest clock signal (¹⁄₁₆), as this is the level automatically selected upon hardware reset in the clock control register (not shown) within the microcontroller 100. If all external interrupts are masked in the interrupt mask register, a system reset is the only way to release the idle mode. The second technique for releasing idle mode is by generation of an internal or external interrupt. According to the second techinque, when an interrupt is used to release the idle mode, the currently selected clock signal is employed, and the interrupt is then serviced. When the return-from-interrupt (IRET) occurs, the instruction immediately following the one causing idle mode to be initiated is executed.

The stop mode of the microcontroller 100 is invoked by setting a stop control register (not shown) within the microcontroller 100. In this mode, the stop control register is loaded with a predetermined value (e.g., 0A5h) before an execution of the STOP instruction. After loading the predetermined value into the stop control register, the STOP instruction halts the microcontroller system clock fx, causing the microcontroller 100 to enter the stop mode.

During stop mode, the contents of on-chip CPU registers, peripheral registers, I/O port control registers, and data registers are retained, and the current supply to the microcontroller is reduced to less than 1 μA. Stop mode can be released and the clock generator 400 can be re-started by a system reset operation and by execution of the power-save release detection circuit 200.

The system reset pin is provided as an input to control two operating modes: a back-up mode and a system reset. Its function as a back-up mode input automatically causes the microcontroller to enter stop mode when the reset pin is set, for example, to a low level. When the reset pin is set to a high state (or a logic '1'), a reset pulse generator (not shown) generates a reset pulse, so as to initiate system reset, and as a result, system operation returns. System reset commonly is controlled by at least three sources: an external reset input, a watchdog timer (i.e., the first timer), or an internal power-on reset (POR) circuit.

The external reset occurs on a rising edge of the reset signal, i.e., when the reset pin switches from a low level (or logic '0') to a high level (or logic '1'). The watch dog timer can recover normal operation from malfunction and generates a system reset signal RESET if it is not cleared by the program within a specified time period. The internal POR circuit is operated during power-up of the microcontroller and detects the power-up condition.

With continuing reference to FIG. 1, the input port circuit 110 inputs data signals INPUT to the microcontroller via its associated input ports. The output port circuit 130 outputs data signals OUTPUT from the microcontroller via its associated output ports. The input and output port circuits 110 and 130 are coupled to rows and columns of a key matrix circuit (not shown) through their ports, respectively. The clock generator 400 stops generating the system clock signal fx in order to reduce power consumption of the microcontroller 100 when a power-save signal STOP becomes active (e.g., high), i.e., in a power saving mode. The frequency divider 500 produces frequency-divided clock signals of the system clock signal fx, for example, one half (½), one eighth (⅛), and one sixteenth (¹⁄₁₆) of the frequency of the system clock signal fx, respectively. The clock selector 600, such as a multiplexer, selects one of the output clock signals of the frequency divider 500 in response to a clock select signal SELECT determined by control register settings.

The power-save release detection circuit 200 in accordance with the present invention detects transitions of the input and/or output data signal levels and generates a power-save release signal STOP_Rel when such transition occurs. The OR logic gate circuit 300 has a first input for receiving the power-save release signal STOP_Rel, a second input for receiving the system reset signal RESET provided for resetting the system on which the microcontroller 100 is mounted, and an output for providing an oscillation start signal START when either the power-save release signal STOP_Rel or the system reset signal RESET is activated (e.g., high). The system reset signal RESET must remain active (e.g., high) until a required oscillation stabilization interval has elapsed. As a result, the clock generator 400 begins to once again generate the microcontroller system clock signal fx in response to the oscillation start signal START, and, as a result, the microcontroller is released from power-saving mode.

The program memory 910 is provided for storing the microcontroller 100 control program and typically includes a read only memory (ROM) such as a mask ROM, an electrically erasable and programmable ROM (EEPROM), or a flash EEPROM. The data memory 920 is used to store data and comprises, for example, a register file, a static RAM, or a dynamic RAM. The CPU 930 is the heart of the microcontroller system, and is responsible for performing all arithmetic operations and logic decisions initiated by the control program stored in the control memory 910, and further controls overall system operation. The I/O and interrupt control circuitry 940 controls signal input/output operations and interrupt processing.

The microcontroller 100 may comprise, for example, four programmable I/O ports including three 8-bit ports (Port 0–Port 2) and one 2-bit port (Port 3), twelve bit-programmable pins for external interrupts, a system reset pin, a first primary timer for oscillation stabilization and watchdog functions (software system reset), secondary and tertiary timers with selectable operating modes, and a counter with auto-reload function and one-shot or repeat control, which are not shown in the drawings.

In one example, the first 8-bit or pin port (Port 0) is assigned to external interrupt inputs. This port is also dedicated for key inputs in remote control applications. The second 8-pin port (Port 1) is dedicated for key outputs in remote controller application. The third 8-pin port (Port 2) can be used as external interrupt inputs. The 2-pin port (Port 3) is configured using a 4-bit data value to support input functions or output functions, and also preferably has high current drive capability to drive infra-red and indicator LEDs (light emitting diodes). An input port circuit corresponding to Port 3 includes a register that contains three status bits: two for the Port 3 and one for carrier signal on/off status.

Figure 2:
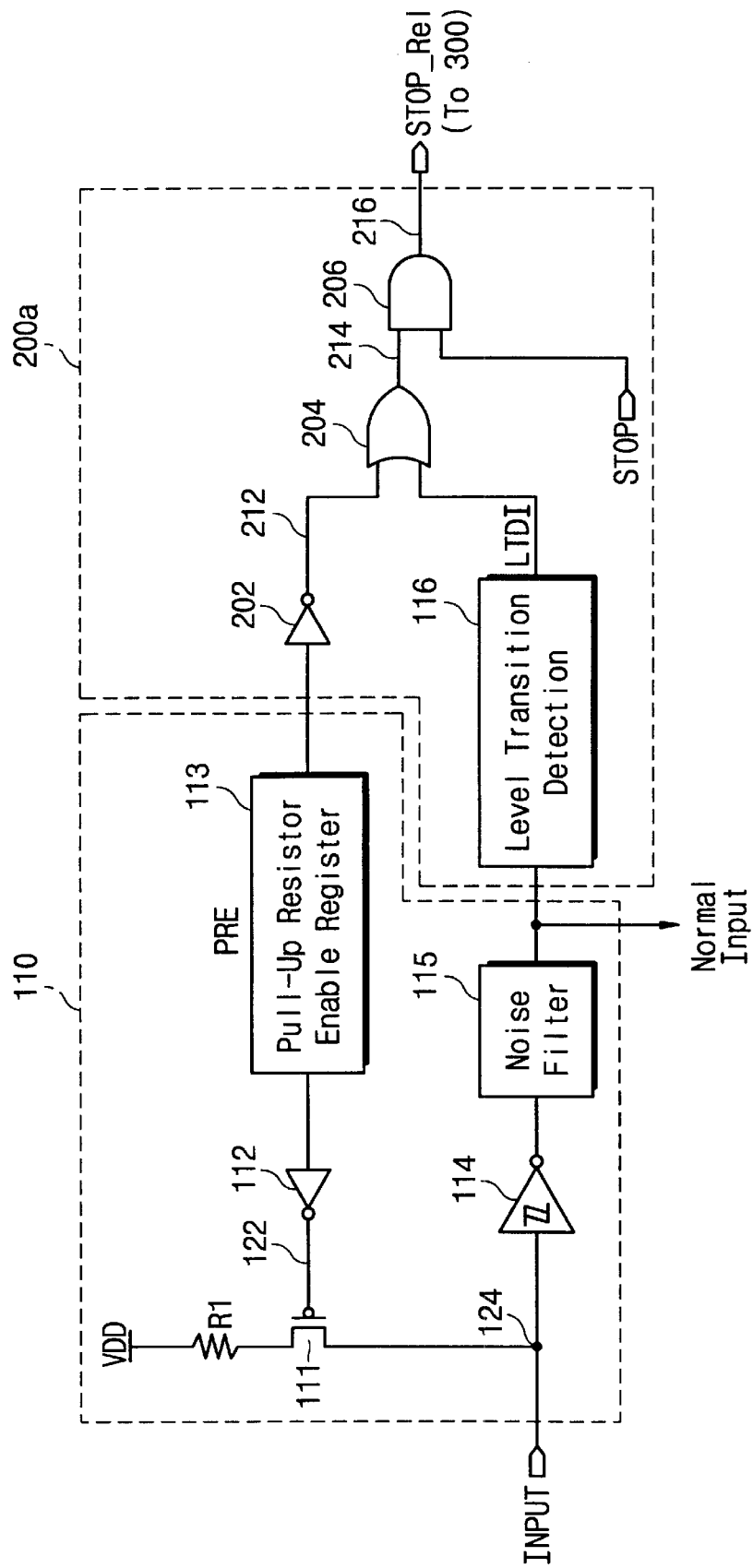
FIG. 2 is a detailed circuit diagram of an input port circuit and a first portion of the power-save release detection circuit shown in FIG. 1.

FIG. 2 illustrates detailed circuit configurations of the input port circuit 110 and a portion 200a of the power-save mode release detection circuit 200 shown in FIG. 1. With reference to FIG. 2, the input port circuit 110 includes a data input terminal 124 for receiving an input data signal INPUT, a power supply terminal VDD for providing a power supply voltage of, e.g., 2.0 volts to 5.5 volts, a pull-up resistor R1, a PMOS transistor 111 operating as a switch, an inverter gate 112 functioning as a switch driver, a pull-up-resistor enable register 113, a schmitt trigger inverter 114, and a noise filter 115.

The pull-up resistor R1 is coupled between the power supply terminal VDD and the PMOS transistor 111. This semiconductor switch, i.e., the PMOS transistor 111, includes a pair of current-conducting path terminals (i.e., source-drain electrodes) coupled between the pull-up resistor R1 and the data input terminal 124, and a control terminal (i.e., a gate electrode). The pull-up-resistor enable register 113 is provided for storing a pull-up-resistor enable/disable signal PRE. The switch drive circuit (i.e., the inverter gate) has an input coupled to receive the pull-up-resistor enable/disable signal PRE and an output coupled to a control terminal (i.e., a gate electrode) of the semiconductor switch 111. The schmitt trigger inverter 114 has an input coupled to the data input terminal 124 and a noise filter 115 coupled to an output of the schmitt trigger inverter 114. The noise filter 115 provides a normal input signal (i.e., filtered input signal) to internal circuits of the microcontroller 100 at its output.

When the pull-up-resistor enable/disable signal PRE is in a low state, the semiconductor switch 111 is turned off, so that the pull-up resistor R1 is not used for the input port circuit 110. In contrast, when the pull-up-resistor enable/disable signal PRE is in a high state, the semiconductor switch 111 is turned on, so that the data input terminal 124 is driven to a high level.

The power-save release detection circuit 200a is connected to the input port circuit 110 and detects a transition of the input data signal level in the power saving mode. When a transition of the level of the input data signal INPUT occurs, the power-save release detection circuit 200a generates a power-save release signal STOP_Rel which operates to release the clock generator 400 from the power saving mode so that the clock generator 400 resumes generating the microcontroller system clock signal fx in response to the power-save release signal.

Continuing to refer to FIG. 2, the power-save release detection circuit 200a includes a level transition detection circuit 116, an inverter gate 202, an OR logic gate 204, and an AND logic gate 206. The level transition detection circuit 116 senses and detects a transition in the level of the data input signal INPUT provided from the data input terminal 124 via the schmitt trigger inverter 114 and the noise filter 115, and generates a level transition detection signal LTDI of an active high state upon a transition of the voltage level of the data input signal INPUT. The inverter gate 202 has an input coupled to receive the pull-up-resistor enable/disable signal PRE and an output coupled to a first input of the OR logic gate 204. A second input of the OR logic gate 204 is coupled to receive the level transition detection signal LTDI. The AND logic gate 206 has a first input coupled to an output of the OR logic gate 204, a second input coupled to receive a power-save signal STOP that causes the clock generator 400 to enter power saving mode, and an output for providing a power-save mode release signal STOP_Rel. The output of the OR logic gate 204 becomes high when the pull-up-resistor enable/disable signal PRE is low, or when the level transition detection signal LTDI is high.

For a remote controller application, the pull-up-resistor enable register 113 (or the pull-up-resistor enable/disable signal PRE) is preferably set to remain high during the stop mode. If, however, the pull-up-resistor enable register 113 contains the pull-up-resistor enable/disable signal PRE at a low level due to noises, or the like, then the corresponding inverter gate 202 provides a high level signal to the OR logic gate 204, so that the OR logic gate 204 provides a high level output to the AND logic gate 206.

When both the power-save signal STOP and the output of the OR logic gate 204 become high during stop mode, the power-save release signal STOP_Rel becomes high. As a result, the clock generator 400 resumes generation of the microcontroller system clock signal fx when the level transition of the data input signal INPUT occurs or when the pull-up-resistor enable register 133 (or the pull-up-resistor enable/disable signal PRE) is not set at the high level.

Figure 3:
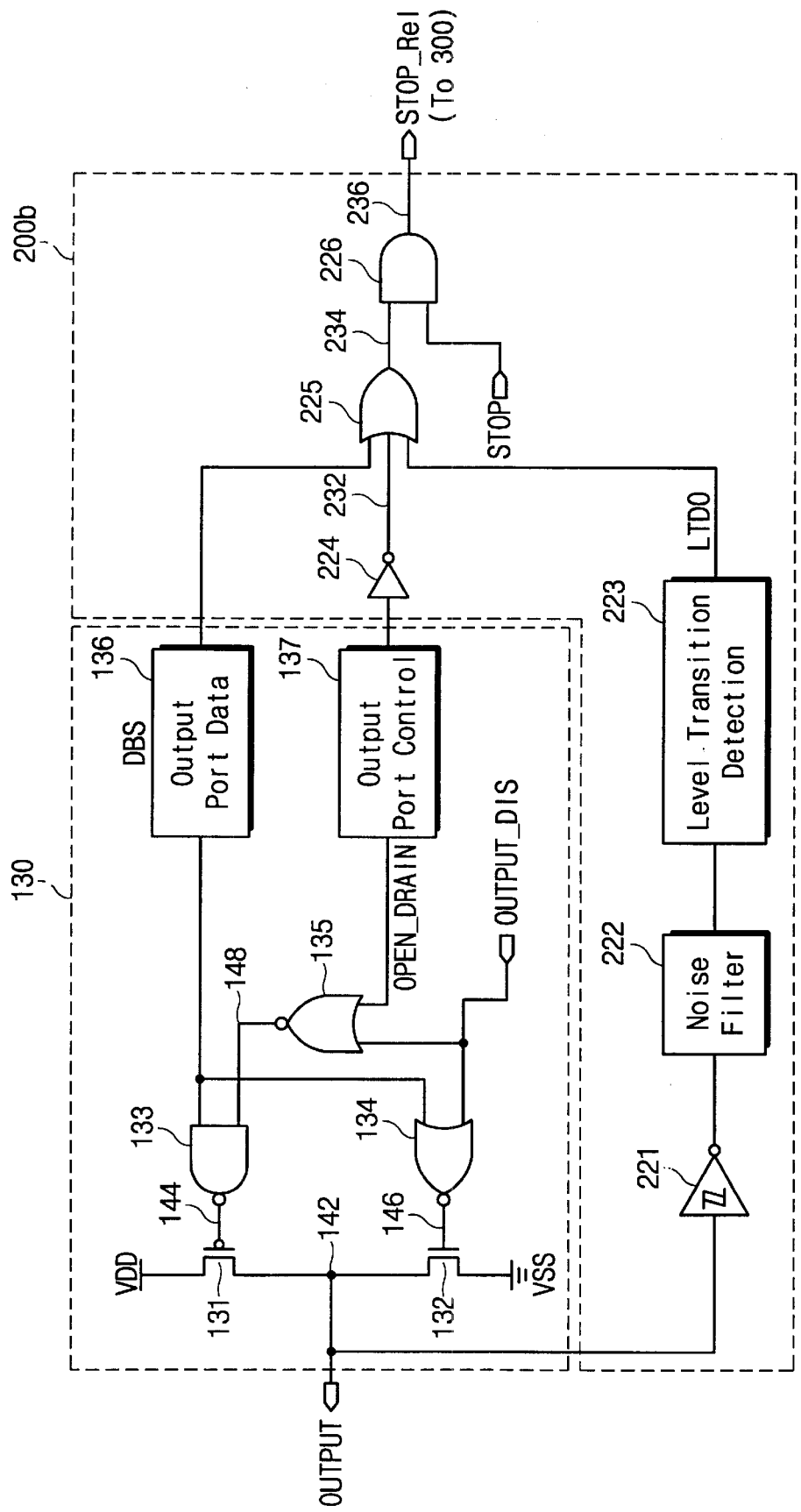
FIG. 3 is a detailed circuit diagram of an output port circuit and a second portion of the power-save release detection circuit shown in FIG. 1.

FIG. 3 illustrates detailed circuit configurations of the output port circuit 130 and the other portion 200b of the power-save release detection circuit 200 shown in FIG. 1. With reference to FIG. 3, the output port circuit 130 includes a first power supply terminal VDD for providing an upper power supply voltage of, e.g., 2.0 volts to 5.5 volts, a second power supply terminal VSS for providing a lower power supply voltage of, e.g., a ground level, a PMOS transistor 131 serving as a first switch, an NMOS transistor 132 serving as a second switch, a NAND logic gate 133, two NOR logic gates 134 and 135, an output port data register 136, and an output port control register 137.

The output port data register 136 stores an output data bit DBS, and the output port control register 137 stores an open-drain output mode enable/disable signal OPEN_DRAIN. The NAND logic gate 133, and the NOR logic gates 134 and 135 function as a switch drive circuit having three inputs for receiving the output data bit DBS, the open-drain output mode enable/disable signal OPEN_DRAIN and an output disable signal OUTPUT_DIS, respectively, and two outputs 144 and 146 coupled to the semiconductor switches 131 and 132, respectively. The first NOR logic gate 135 has a first input coupled to receive the open-drain output mode enable/disable signal OPEN_DRAIN and a second input coupled to receive the output disable signal OUTPUT_DIS. The NAND logic gate 133 has a first input coupled to receive the output data bit DBS from the data output port register 136 and a second input coupled to an output of first NOR logic gate 135. The second NOR logic gate 134 has a first input coupled to receive the open-drain output mode enable/disable signal OPEN_DRAIN and a second input coupled to receive the output data bit DBS.

The data output terminal 142 provides an output data signal OUTPUT corresponding to the output data bit DBS. The first semiconductor switch 131 has a pair of current-conducting path terminals (i.e., source-drain electrodes) coupled between the first power supply terminal VDD and the data output terminal 142 and a control terminal (i.e., a gate electrode) coupled to the first output of the switch drive circuit, i.e., the output of the NAND logic gate 133. The second semiconductor switch has a pair of current-conducting path terminals (i.e., source-drain electrodes) coupled between the data output terminal 142 and the second power supply terminal VSS and a control terminal (i.e., a gate electrode) coupled to the second output of the switch drive circuit, i.e., the output of the second NOR logic gate 134.

When the output disable signal OUTPUT_DIS is active (high), both outputs 144 and 146 of the switch drive circuit, i.e., the outputs of the NAND logic gate 133 and the NOR logic gate 134, become high and low levels, respectively. The switches 131 and 132 both are accordingly turned off, so that the data output terminal 142 is floated.

When the output disable signal OUTPUT_DIS is inactive (low) and the open-drain output mode enable/disable signal OPEN_DRAIN is inactive (low), the output of the NOR logic gate 135 becomes high. As a result, the first and second outputs 144 and 146 of the switch drive circuit, i.e., the outputs of the NAND logic gate 133 and the NOR logic gate 134, are determined by the logic state of the output data bit DBS in a push-pull output mode. At this time, if the output data bit DBS is logic '0' or low then the switches 131 and 132 turn off and on, respectively, thereby pushing the data output terminal 142 down to a low level, but if the output data bit DBS is logic '1' or high then the switches 131 and 132 turn on and off, respectively, thereby pulling the data output terminal 142 up to a high level.

When the output disable signal OUTPUT_DIS remains inactive (low) and the open-drain output mode enable/disable signal OPEN_DRAIN goes active (high), the output of the NOR logic gate 135 becomes low. As a result, the first and second outputs 144 and 146 of the switch drive circuit, i.e., the outputs of the NAND logic gate 133 and the NOR logic gate 134, are determined by the logic state of the output data bit DBS. At this time, if the output data bit DBS is logic '0' or low then the switches 131 and 132 turn off and on, respectively, thereby pushing the data output terminal 142 down to a low level, but if the output data bit DBS is logic '1' or high, then both switches 131 and 132 turn off, causing the data output terminal 142 to remain in an open-drain output mode, especially applicable for remote control applications.

Continuing to refer to FIG. 3, the power-save release detection circuit 200b includes a schmitt trigger inverter 221, a noise filter 222, and a level transition detection circuit 223. The schmitt trigger inverter 221 has an input coupled to the data output terminal 142. The noise filter 222 is coupled between an output of the schmitt trigger inverter 221 and an input of the level transition detection circuit 223. The level transition detection circuit 223 detects a level transition of the output data signal OUTPUT provided through the schmitt trigger inverter 221 and the noise filter 222, and generates a level transition detection signal LTDO when transition in the level of the output data signal OUTPUT occurs during the power saving mode.

The power-save release detection circuit 200b further includes an inverter gate 224, an OR logic gate 225, and an AND logic gate 226. An input of the inverter gate 224 is coupled to receive the open-drain output mode enable/disable signal OPEN_DRAIN. The OR logic gate 225 has a first input coupled to receive the output data bit DBS from the output port data register 136, a second input coupled to receive the level transition detection signal LTDO from the output port control register 137 and a third input coupled to an output of the inverter gate 224. The AND logic gate 226 has a first input coupled to an output of the OR logic gate 225, a second input coupled to receive the power-save signal STOP and an output for providing the power-save release signal STOP_Rel.

For the remote controller application, the output port control register 137 or the open-drain output mode enable/disable signal OPEN_DRAIN is set to remain high during the stop mode. If, however, the output port control register 137 contains the open-drain output mode enable/disable signal OPEN_DRAIN of a low level due to noises, or the like, then the inverter gate 224 provides its output at a high level to the OR logic gate 225, so that the OR logic gate provides its output of a high level to the AND logic gate 226. The OR logic gate 225 also provides its output of a high level to the AND logic gate 226 when the output data bit DBS is high.

When both the power-save signal STOP and the output of the OR logic gate 225 become high in the stop mode, the power-save release signal STOP_Rel goes high. As a result, the clock generator 400 resumes generation of the microcontroller system clock signal fx when the level transition of the data output signal OUTPUT occurs, or when the output port control register 137 (or the open-drain output mode enable/disable signal OPEN_DRAIN) fails to be set at a high level, or when the output data bit DBS is high.

Figure 4:
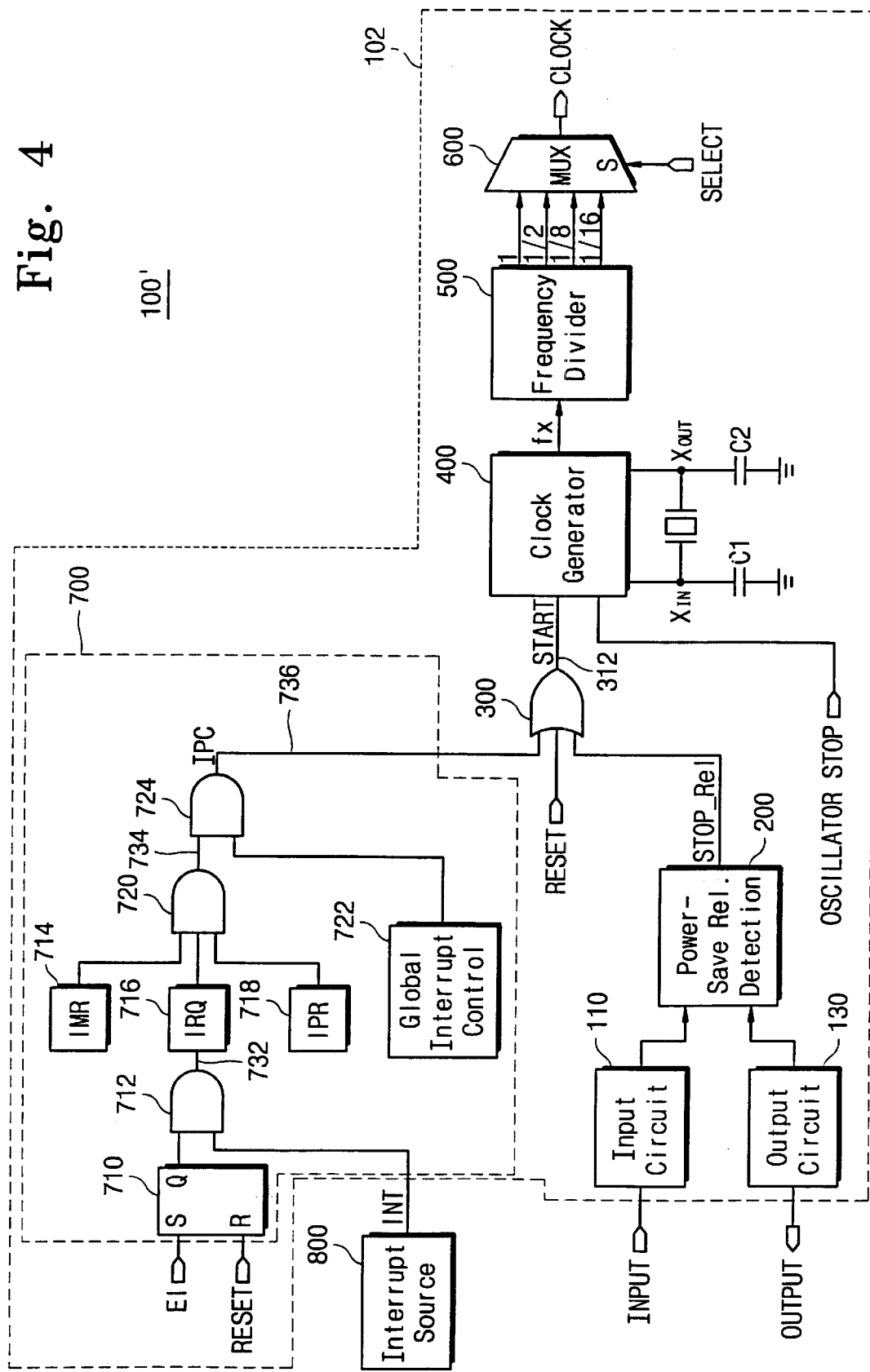
FIG. 4 is a block diagram of a second preferred embodiment of a microcontroller according to the present invention.

FIG. 4 illustrates a microcontroller 100' according to another preferred embodiment of the present invention. Referring to FIG. 4, the microcontroller 100' has the same arrangement as that shown in FIG. 1 with the exception that the microcontroller 100' includes an interrupt control circuit 700. In FIG. 4, the same components as those of FIG. 1 are represented with like reference numerals and to avoid description duplication, accordingly, their explanation will be omitted.

The stop mode of the microcontroller 100' can be released and the clock generator 400 can be initiated by an internal or external interrupt, as well as by the system reset operation and by the power-save release signal.

The microcontroller 100' has a predetermined interrupt structure that can recognize up to eight interrupt levels IRQ0–IRQ7 for example. Each level can have one or more interrupt sources and vectors. Fast interrupt processing (within a minimum of six CPU clocks) can be assigned to specific interrupt levels.

With reference to FIG. 4, the interrupt control circuit 700 includes an S-R latch 710, three AND logic gates 712, 720 and 724, an interrupt mask register (IMR) 714, an interrupt request register (IRQ) 716, an interrupt priority register (IPQ) 718, and a global interrupt control register 722.

The S-R latch 710 has a set input S for receiving an interrupt enable signal EI, a reset input R for receiving the system reset signal RESET, and an output of Q. The AND logic gate 716 has a first input coupled to the output Q of the S-R latch 710 and a second input coupled to interrupt sources 800, such as key button switches of a key matrix circuit in a remote controller, that generate one or more interrupts INT. An output of the AND logic gate 712 is coupled to the interrupt request register 716 containing a request pending bit for each interrupt level.

The interrupt mask register 714, interrupt request register 716 and interrupt priority register 718 are coupled to first through third inputs of the AND logic gate 720, respectively. The interrupt mask register 714 enables/disables interrupt processing for individual interrupt levels, depending on its bit settings. The interrupt priority register 718 controls the relative processing priorities of the interrupt levels in the interrupt structure of the microcontroller 100'. When more than one interrupt sources are active, the source with the highest priority is serviced first. If two sources belong to the same priority level, the source with lower vector address usually has priority. This priority is fixed in hardware. The global interrupt control register 722, such as a system mode register, enables/disables global interrupt processing and fast interrupt processing.

With continuing reference to FIG. 4, an output of the AND logic gate 720 is coupled to a first input of the AND logic gate 724 and the global interrupt control register 800 is coupled to a second input of the AND logic gate 724. An output of the AND logic gate 724, i.e., an interrupt processing control signal IPC, is coupled to a first input of the OR logic gate 300. A second input and a third input of the OR logic gate 300 are coupled to the system reset signal RESET and the power-save release signal STOP_Rel, respectively.

The output Q of the S-R latch 710 is at a high level when the interrupt enable signal EI becomes high, and is at a low level when the system reset signal RESET becomes high. When the interrupt enable signal EI goes high and an interrupt is generated by the interrupt sources 800, the output of the AND logic gate 712 becomes high so that a logic '1' is stored in the interrupt request register 716. At this time, if the interrupt mask register 714 and the interrupt priority register 718 store logic '1s', respectively, then the AND logic gate 720 provides an output of logic '1'. Furthermore, if the global interrupt control register 722 stores a logic '1', then the AND logic gate 724 also provides the interrupt processing control signal IPC of a high level. As a result, the oscillation start signal START goes high so that the clock generator 400 resumes generating the microcontroller system clock signal fx.

According to this embodiment, the output of the OR logic gate 300 is at a high level when the system reset signal RESET or the power-save release signal STOP_Rel goes high so that the stop mode of the microcontroller 100' can be released and the clock generator 400 can resume generating the microcontroller system clock signal fx.

As described above, according to the present invention, by detecting a transition in the level of input or output data signals, a controller can be released from power-save mode, irrespective of the occurrence of power-save mode release errors, for example due to the erroneous setting of bits in controller registers.

While this invention has been particularly shown and described with references to preferred embodiments thereof, it will be understood by those skilled in the art that various changes in form and detail may be made herein without departing from the spirit and scope of the invention as defined by the appended claims.

What is claimed is:

1. A microcontroller having a power saving mode by which power consumption is reduced, comprising:

at least one data port sensing circuit for sensing a level of at least one data signal;

a power-save release detection circuit coupled to said at least one data port sensing circuit, for detecting a transition in the level of the at least one data signal during operation in said power saving mode, and for generating a power-save release signal to release said microcontroller from the power saving mode upon the transition in the level of the at least one data signal;

an interrupt control circuit for generating an interrupt processing control signal when at least one interrupt is generated by at least one interrupt source; and a logic gate circuit having a first input for receiving the power-save release signal, a second input for receiving a system reset signal to reset a system on which said microcontroller is mounted, a third input for receiving the interrupt processing control signal, and an output for providing a second release signal to release said microcontroller from the power saving mode when at least one of the power-save release signal, the system reset signal and the interrupt processing control signal is activated.

2. The microcontroller as set forth in claim 1, wherein said data port sensing circuit senses input data at an input data port and senses output data at an output data port.

3. The microcontroller as set forth in claim 1, wherein said microcontroller is used for controlling a remote control transmitter.

4. A microcontroller comprising:

a clock generator for generating a microcontroller system clock signal, the microcontroller having a power-saving mode during activation of which the clock generator ceases generating the microcontroller system clock signal to reduce power consumption by said microcontroller;

at least one data port sensing circuit for sensing a level of at least one data signal;

a power-save release detection circuit coupled to said at least one data port sensing circuit, for detecting a transition in the level of the at least one data signal during operation in said power saving mode, and for generating a power-save mode release signal to release said clock generator from the power saving mode upon the transition in the level of the at least one data signal; and a logic gate circuit having a first input for receiving the power-save release signal, a second input for receiving a system reset signal to reset a system on which said microcontroller is mounted and an output for providing an oscillation start signal when at least one of the power-save mode release signal and the system reset signal is activated, whereby said clock generator initiates generation of the microcontroller system clock signal in response to the oscillation start signal.

5. The microcontroller as set forth in claim 4, wherein said logic gate circuit is an OR gate.

6. The microcontroller as set forth in claim 4, further comprising an interrupt control circuit for generating an interrupt processing control signal when at least one interrupt is generated by at least one interrupt source; and wherein the logic gate circuit further includes a third input for receiving the interrupt processing control signal, and wherein the output provides the oscillation start signal when at least one of the power-save release signal, the system reset signal and the interrupt processing control signal is activated.

7. The microcontroller as set forth in claim 6, wherein said logic gate circuit comprises an OR gate.

8. The microcontroller as set forth in claim 4, wherein said microcontroller is used for controlling a remote control transmitter.

9. A microcontroller comprising:

a clock generator for generating a microcontroller system clock signal, the microcontroller having a power-saving mode during activation of which the clock generator ceases generation of the microcontroller system clock signal;

a data input terminal for receiving a data signal;

a power supply terminal for providing a power supply voltage;

a pull-up resistor having a first end coupled to said power supply terminal, and a second end;

a semiconductor switch having a pair of current-conducting path terminals coupled between the second end of said pull-up resistor and said data input terminal, and a control terminal;

a pull-up-resistor enable register for storing a pull-up-resistor enable signal;

a first inverter gate having an input coupled to receive the pull-up-resistor enable signal and an output coupled to the control terminal of said semiconductor switch;

a level transition detection circuit for detecting a transition in the level of the data signal to generate a level transition detection signal;

a second inverter gate having an input coupled to receive the pull-up-resistor enable signal, and an output;

an OR logic gate having a first input coupled to receive the level transition detection signal, a second input coupled to the output of said second inverter gate, and an output; and an AND logic gate having a first input coupled to the output of said OR logic gate, a second input coupled to receive a power-save signal, which, when active, causes the microcontroller to enter power saving mode, and an output for providing a power-save release signal to release said clock generator from the power saving mode when both of the level transition detection signal and the power-save signal become active, whereby said clock generator resumes generation of the microcontroller system clock signal in response to the power-save release signal.

10. The microcontroller as set forth in claim 9, wherein said semiconductor switch comprises a P-channel MOS field effect transistor.

11. The microcontroller as set forth in claim 9, further comprising:

a schmitt trigger inverter having an input coupled to said data input terminal, and an output; and a noise filter coupled between the output of said schmitt trigger inverter and said level transition detection circuit.

12. The microcontroller as set forth in claim 9, wherein said microcontroller is used for controlling a remote control transmitter.

13. A microcontroller comprising:

a clock generator for generating a microcontroller system clock signal, the microcontroller having a power-saving mode during activation of which the clock generator ceases generation of the microcontroller system clock signal;

an output port data register for storing a data bit;

an output port control register for storing an open-drain output mode enable signal;

a first NOR logic gate having a first input coupled to receive the open-drain output mode enable signal, a second input coupled to receive an output disable signal, and an output;

a NAND logic gate having a first input coupled to receive the data bit, a second input coupled to the output of said first NOR logic gate, and an output;

a second NOR logic gate having a first input coupled to receive the open-drain output mode enable signal, a second input coupled to receive the data bit, and an output;

a data output terminal for providing a data signal corresponding to the data bit;

a first power supply terminal for providing an upper power supply voltage; a second power supply terminal for providing a lower power supply voltage;

a first semiconductor switch having a pair of current-conducting path terminals coupled between said first power supply terminal and said data output terminal, and a control terminal coupled to the output of said NAND logic gate;

a second semiconductor switch having a pair of current-conducting path terminals coupled between said data output terminal and said second power supply terminal, and a control terminal coupled to the output of said second NOR logic gate;

a level transition detection circuit for detecting a transition in the level of the data signal to generate a level transition detection signal;

an inverter gate having an input coupled to receive the open-drain output mode enable signal, and an output;

an OR logic gate having a first input coupled to receive the data bit, a second input coupled to receive the level transition detection signal, a third input coupled to the output of said inverter gate, and an output; and an AND logic gate having a first input coupled to the output of said OR logic gate, a second input coupled to receive a power-save signal which, when active, causes the microcontroller to enter power saving mode, and an output for providing a power-save release signal to release said clock generator from the power saving mode when both of the level transition detection signal and the power-save signal become active, whereby said clock generator resumes generation of the microcontroller system clock signal in response to the power-save release signal.

14. The microcontroller as set forth in claim 13, wherein said first semiconductor switch comprises a P-channel MOS field effect transistor.

15. The microcontroller as set forth in claim 13, wherein said second semiconductor switch comprises an N-channel MOS field effect transistor.

16. The microcontroller as set forth in claim 13, further comprising:
   a schmitt trigger inverter having an input coupled to said data output terminal, and an output; and
   a noise filter coupled between the output of said schmitt trigger inverter and said level transition detection circuit.

17. The microcontroller as set forth in claim 13, wherein said microcontroller is used for controlling a remote control transmitter.

* * * * *